(12) United States Patent
Gao et al.

(10) Patent No.: US 10,296,534 B2
(45) Date of Patent: *May 21, 2019

(54) STORING AND SEARCHING FINGERPRINTS DERIVED FROM MEDIA CONTENT BASED ON A CLASSIFICATION OF THE MEDIA CONTENT

(71) Applicant: Dolby Laboratories Licensing Corporation, San Francisco, CA (US)

(72) Inventors: Tianshi Gao, Stanford, CA (US); Regunathan Radhakrishnan, San Bruno, CA (US); Wenyu Jiang, Singapore (SG); Claus Bauer, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 532 days.

This patent is subject to a terminal disclaimer.

(21) Appl. No.: 14/730,185

(22) Filed: Jun. 3, 2015

(65) Prior Publication Data
US 2015/0269149 A1    Sep. 24, 2015

Related U.S. Application Data

(63) Continuation of application No. 13/319,255, filed as application No. PCT/US2010/033654 on May 5, 2010, now Pat. No. 9,075,897.

(60) Provisional application No. 61/176,815, filed on May 8, 2009.

(51) Int. Cl.
*G06F 17/30* (2006.01)
*G06F 16/51* (2019.01)
*G06F 16/903* (2019.01)
*G06K 9/00* (2006.01)
*G06K 9/52* (2006.01)
*G06K 9/62* (2006.01)

(52) U.S. Cl.
CPC ............ *G06F 16/51* (2019.01); *G06F 16/903* (2019.01); *G06K 9/00087* (2013.01); *G06K 9/00744* (2013.01); *G06K 9/52* (2013.01); *G06K 9/6201* (2013.01); *G06K 9/6267* (2013.01)

(58) Field of Classification Search
CPC .................................................. G06F 17/30964
USPC ......................................................... 707/741
See application file for complete search history.

(56) References Cited

U.S. PATENT DOCUMENTS

| 9,075,897 B2 | 7/2015 | Gao et al. |
| 2003/0231806 A1 | 12/2003 | Troyanker |
| 2007/0033409 A1 | 2/2007 | Brunk et al. |
| 2012/0054194 A1 | 3/2012 | Gao et al. |

OTHER PUBLICATIONS

U.S. Appl. No. 13/319,255, filed Nov. 7, 2011, Office Action, July 31, 2014.
U.S. Appl. No. 13/319,255, Notice of Allowance dated Mar. 5, 2015.
The State Intellectual Property Office of the Peoples Republic of China, "Notification on Grant of Patent Right for Invention", in application No. 201080019695.8, dated Mar. 10, 2014, 7 pages.

*Primary Examiner* — Mahesh H Dwivedi
*Assistant Examiner* — Johnese Johnson (57) ABSTRACT

Attributes are identified in media content. A classification value of the media content is computed based on the identified attributes. Thereafter, a fingerprint derived from the media content is stored or searched for based on the classification value of the media content.

25 Claims, 8 Drawing Sheets

| | |
|---|---|
| Classification Value ACD<br>402<br><br>Fingerprints derived from<br>Media Content with attributes A, C, and D | Classification Value CE<br>404<br><br>Fingerprints derived from<br>Media Content with attributes C and E |
| Classification Value AFK<br>406<br><br>Fingerprints derived from<br>Media Content with attributes A, F, and K | Classification Value Blank<br>408<br><br>Fingerprints derived from<br>Media Content without any identified attributes |
| Classification Value K<br>410<br><br>Fingerprints derived from<br>Media Content with attribute K | Classification Value ABCDEFK<br>412<br><br>Fingerprints derived from<br>Media Content with attributes A, B, C, D, E, F, and K |

STORING AND SEARCHING FINGERPRINTS DERIVED FROM MEDIA CONTENT BASED ON A CLASSIFICATION OF THE MEDIA CONTENT

CROSS-REFERENCE TO RELATED APPLICATIONS

This application claims benefit as a Continuation of U.S. patent application Ser. No. 13/319,255, filed 7 Nov. 2011, which is a national stage application of International Patent Application No. PCT/US2010/033654, filed on 5 May 2010, which claims priority to U.S. Patent Provisional Application No. 61/176,815, filed 8 May 2009, under 35 U.S.C. §120. The above-mentioned patent applications are assigned to the assignee of the present application and are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNOLOGY

The present invention relates generally to media content fingerprints. More specifically, embodiments of the present invention relate to storing and/or searching fingerprints derived from media content based on classification of the media content.

BACKGROUND

Media clips or media content generally represent audio media, video media, audio/visual (AV) media, still images, or any other suitable media and include information that is embodied, stored, transmitted, received, processed, or otherwise used with at least one medium. Common media clip formats include FLV format (flash video), Windows Media Video, RealMedia, Quicktime, MPEG, MP3, DivX, JPEGs, Bitmaps, or GIFs. As used herein, the terms "media clips", "media content," "information content," and "content" may be used interchangeably.

Media clips may be defined with one or more images. For example, video media may be a combination of a set of temporally related frames or images at particular points in time of the video media. Additionally, audio media may be represented as one or more images using many different techniques known in the art. For example, audio information may be captured in a spectrogram. In the spectrogram, the horizontal axis can represent time, the vertical axis can represent frequency, and the amplitude of a particular frequency at a particular time can be represented in a third dimension. Further, in a two dimensional spectrogram, the amplitude may be represented with thicker lines, more intense colors or grey values. Many different modifications to the above example and other representations may be used to represent an audio clip as an image.

Images that define media content (audio and/or video) may be associated with a corresponding fingerprint ("fingerprint" used interchangeably with and equivalent to "signature"). Some fingerprints of media content may be derived (e.g., extracted, generated, computed) from information within, or which comprises a part of the media content. A media fingerprint embodies or captures an essence of the media content of the corresponding media and may be uniquely identified therewith. Video fingerprints are media fingerprints that may be derived from images or frames of a video clip. Audio fingerprints are media fingerprints that may be derived from images with embedded audio information (e.g., spectrograms). Further, the term media fingerprint may refer to a low bit rate representation of the media content with which they are associated and from which they are derived.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

The example embodiments described herein relate to storing and searching for fingerprints derived (e.g., extracting, generating, determining, computing) from media content based on a classification of the media content. In the following description, for the purposes of explanation, numerous specific details are set forth in order to provide a thorough understanding of the present invention. However, the present invention may be practiced without these specific details. In other instances, well-known structures and devices are shown in block diagram form in order to avoid unnecessarily obscuring the present invention.

Example embodiments are described herein according to the following outline:

1.0 General Overview
    2.0 Architectural and Functional Overview
    3.0 Storing a Fingerprint of Media Content based on Classification of the Media Content
    4.0 Searching for a Fingerprint of Media Content based on Classification of the Media Content
    5.0 Implementation Mechanisms—Hardware Overview
    6.0 Equivalents, Extensions, Alternatives, and Miscellaneous 1.0 General Overview Fingerprints may be used to determine whether two media clips are identical or if a suspect media clip has been derived from the original media clip. Fingerprints of a short media clip may also be used to identify the larger media clip that the short media clip was taken from. For example, in order to identify a song based on a ten second clip of the song, a fingerprint may be derived from the ten second clip and the fingerprint (or hash value of the fingerprint) may then be compared to a large database of fingerprints (or fingerprint hash values) corresponding to thousands of audio recordings to find a match and identify the complete song. In another example, a query fingerprint derived from one or more features of a suspect image, may be compared to stored fingerprints in a database to identify a match for the suspect image.

In an embodiment, storing a fingerprint derived from a media content includes identifying attribute(s) in the media content and computing a classification value of the media content based on the identified attributes(s). Thereafter, the fingerprint derived from the media content is stored with the classification value of the media content.

The classification value may be computed such that the classification value identifies the attribute(s) from which it was computed. The classification value may also be computed based on a set of attribute values that are each calculated based on a respective attribute in the media content. In an embodiment, the attribute(s) in the media content may include audio attributes and/or video attributes.

In an embodiment, the attributes in media content may be identified based on metadata associated with the media content or with analyzing the media content to detect the attributes.

In an embodiment, searching a database for a query fingerprint derived from query media content includes analyzing the query media content to identify a set of attribute(s) in the query media content and computing a classification value of the query media content based on the identified attribute(s). Thereafter, the fingerprints derived from media content with the same classification value as the query media content may be identified as a search group, and the search group may be searched for the query fingerprint.

In an embodiment, when the query fingerprint is not found in the search group, fingerprints derived from media content with a classification value similar to the classification value of the query media content may be searched for the query fingerprint.

In an embodiment, when the query fingerprint is not found in the search group, a new classification value of media content may be determined based on a modified set of attribute(s). The modified set of attributes may be obtained, for example, by discarding attributes identified with a low confidence measure. The modified set of attributes may also be obtained by randomly discarding one or more previously identified attributes. Thereafter, fingerprints derived from media content with the new classification value may be identified as a new search group, and the new search group may be searched for the query fingerprint.

Other embodiments of the invention may include a system and computer readable medium with functionality to execute the steps described above.

2.0 Architectural and Functional Overview

Media fingerprints may be described herein with reference to one or more example media, including video and/or audio media. The selection of an example medium in this description may be made for simplicity and concise unity and, unless expressly stated to the contrary, should not be construed as limiting an embodiment to a particular medium as embodiments of the present invention are well suited to function with any media content.

Figure 1:
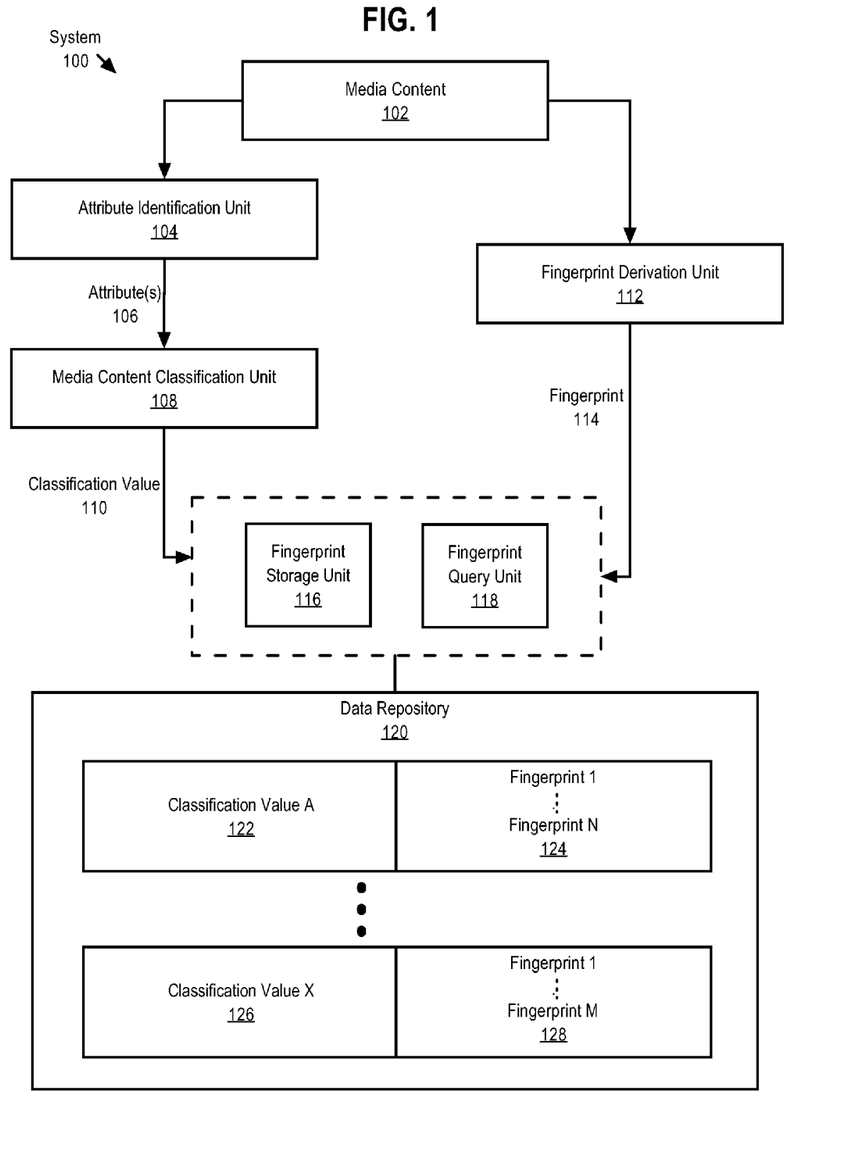
FIG. 1 depicts a block diagram of a system, according to one or more embodiments.

FIG. 1 shows a system (100) in accordance with one or more possible embodiments. As shown in FIG. 1, the system includes an attribute identification unit (104), a media content classification unit (108), a fingerprint derivation unit (112), a fingerprint storage unit (116), a fingerprint query unit (118), and a data repository (120).

Each of these components is described below and may be located on the same device (e.g., a server, mainframe, desktop PC, laptop, PDA, television, cable box, satellite box, kiosk, telephone, mobile phone, etc.) or may be located on separate devices coupled by a network (e.g., Internet, Intranet, Extranet, Local Area Network (LAN), Wide Area Network (WAN), etc.), with wire and/or wireless segments. In one or more embodiments, the system 100 is implemented using a client-server topology. The system (100) itself may be an enterprise application running on one or more servers, and in some embodiments could be a peer-to-peer system, or resident upon a single computing system. In addition, the system (100) is accessible from other machines using one or more interfaces, web portals, or any other tool to access the quality monitoring logic 100. In one or more embodiments, the system (100) is accessible over a network connection, such as the Internet, by one or more users. Information and/or services provided by the system (100) may also be stored and accessed over the network connection.

Media content (e.g., media content (102)) may be described herein with reference to one or more example media, including still images, video, and/or audio media. The selection of example mediums in this description may be made for simplicity and concise unity and, unless expressly stated to the contrary, should not be construed as limiting an embodiment to a particular medium as embodiments of the present invention are well suited to function with either still images, audio media, or video media. Furthermore, embodiments of the present invention are well suited to function with images corresponding to audio and/or video media, which may represent two or three spatial dimensions.

In a possible embodiment, the fingerprint derivation unit 112 corresponds to software and/or hardware used for deriving (e.g., extracting, generating, determining, computing, etc.) a media fingerprint (114) ("fingerprint" used interchangeably with and equivalent to "signature") from media content (102). The fingerprint (114) may correspond to a fingerprint to be stored in the data repository (120) or a query fingerprint that is to be searched for in the database (120). Video fingerprints (114) may be derived from images or frames of a video clip. Audio fingerprints (114) may be derived from images with embedded audio information (e.g., spectrograms). The fingerprint derivation unit 112 may also be configured to derive fingerprints (114) from media content (102) using any other methods known in the art. The fingerprint derivation unit 112 may also be configured to derive multiple fingerprints (114) from the media content (102) (e.g., by using fingerprint derivation techniques with varying levels of robustness or sensitivity to changes). Furthermore, the fingerprint derivation unit 112 may also be configured to separately derive fingerprints for different portions of media content. For example, audio/video media content (102) may be separated into separate components (e.g., an audio component and a video component) using a demultiplexer and a fingerprint (114) may be derived separately for each component.

In a possible embodiment, the attribute identification unit (104) corresponds to software and/or hardware used for identifying attributes (106) in the media content (102). Attributes (106) generally represent any characteristics of media content that may be detected using any audio/video analysis methods. Attributes (106) may include visually perceptible characteristics within the media content that may be detected. Examples of such visually perceptible characteristics that may identify media content include: indoor, outdoor, face, no face, genre, car, no car, day, night, etc. Attributes (106) may include audible sounds in media content (102). For example, an attribute (106) may be the swishing sound of a net indicative of a basketball game, a rhythmic sound indicative of music, a monotonous delivery of words indicative of news or a documentary, a lion's growl indicative of media content related to wildlife. Attributes (106) may include characteristics of the media content that are not visually perceptible to the human eye or audible to the human ear. For example, instead of a simple dark/light classification, average intensity may be grouped into one of eight different classes, that may not be distinguishable by human perception, based on the level of intensity. The attribute (106) may also refer to a combination of multiple attributes. For example, the attribute (106) may be a high-level attribute determined from one or more low-level attributes. A low level attribute may refer to any attribute that is used to determine another attribute, e.g., a high-level attribute. An example of a low-level attribute includes average intensity that may be used to determine a high-level attribute such as indoor scene, outdoor scene, day scene, or night scene. Furthermore, multiple low-level attributes, each indicative of a particular high-level attribute, may be combined to determine the high-level attribute with a higher confidence level. For example, the average intensity may be combined with a local feature detector such as SIFT (Scale Invariant Feature Transform). The local feature detector would capture information about objects in the scene. A detection of high average intensity and a detection of car features, may be used to determine an outdoors scene with a high confidence level, since both high average intensity and car features indicate an outdoor scene.

The attribute identification unit (104) may be configured to identify attributes (106) in media content by analyzing the media content (102) to determine attributes (106), receiving user input indicating the attributes (106) of the media content (102), extracting attributes (106) from metadata associated with the media content (102), determine higher level attributes (106) through a mapping from identified lower level attributes (106) or through any other suitable method. The attribute identification unit (104) may correctly or incorrectly identify attributes (106) in the media content based on the analysis of the media content (102). Attributes (106) identified in the media content (104), as referred to herein, are simply attributes that are hypothesized to be in the media content (102) based on the analysis of the media content (102). The attributes (106) identified in the media content may not necessarily be in the media content (102) as the analysis may be incorrect. Furthermore, attributes (106) not identified (e.g., missed) by the attribute identification unit (104) may actually be in the media content (102).

In a possible embodiment, the media content classification unit (108) corresponds to software and/or hardware configured for classifying media content (102) based on attributes (106) identified in the media content (102). The media content classification unit (108) may be configured to provide discrete or non-discrete classification values (110) for media content (102) based on the attributes (106) identified in the media content (102). In a simple embodiment, a classification value (110) may be a listing of all the attributes (106) identified in the media content (102) or other representation of all the attributes (106) identified in the media content (102). In a possible embodiment, the media content classification unit (108) may generate an attribute value for each identified attribute (106) in the media content (102) and thereafter compute a classification value (110) (e.g., including one or more numbers) based on the attributes values. Each attribute value may directly represent the presence or absence of a respective attribute identified in the media content. For example, when an image is analyzed for the presence or absence of three attributes, where the second and third attributes are present, then the classification value (110) of the image may be the set (0, 1, 1) representing. The classification value (110) may include one or more numbers, characters, and/or symbols. The classification value (110) of media content may also be obtained by applying a function to the attribute values to obtain a single number. For example, for three attribute values 0, 1, and 1, the classification value (110) may be an average of attribute values computed to 0.6667. In an embodiment, the classification value (110) may itself indicate the attributes (106) used to calculate that classification value (110). For example, a classification value "CE" of media content (102) may indicate that the media content (102) has attributes C and E.

In an embodiment, a confidence measure (used interchangeably with confidence level) may be used with the identification of an attribute (106) in the media content. The confidence measure of an attribute value indicates a likelihood of the presence of the attribute. For example, an analysis of an image may result in a determination that four of the five characteristics indicative of a car are present in the image. Based on this determination, an 80% confidence measure (4 divided by 5) may be computed for the presence of a car in the image. This confidence measure may be used in addition to the attribute value to compute the classification value (110) or may be a part of the attribute value itself. For example, when an analysis of an image that searches for the presence of three attributes and determines that a first attribute is absent, a second attribute is present with an 80% confidence level, and a third attribute is present with a 100% confidence level, then the classification value (110) may be the set (0, 0.8, 1). Image analysis for the detection of ten different attributes may result in a classification value (110) that includes a set of ten numbers representing the presence of the ten attributes, or alternatively, a set of any other suitable size. In an embodiment, attribute values may be weighted. For example, an attribute value of an attribute that is easy to detect may be weighed more heavily in calculating a classification value (110) than an attribute value of an attribute that is hard to detect.

In a possible embodiment, the fingerprint storage unit (116) corresponds to software and/or hardware configured for storing the fingerprint (114) of the media content (102) in the data repository (120) based on the classification value (110) of the media content (102). For example, the fingerprint (114) of the media content (102) may be indexed under the classification value (110) of the media content (102). Another example may involve storing each fingerprint (114) at a node of a tree, where each node is identified by a classification value (110) associated with the respective fingerprints. Another example may involve storing each fingerprint (114) of the media content (102) in a pair with the classification value (110) of the media content (102). A multitude of other implementations may be used for storing the fingerprint (114) that directly or indirectly link the fingerprint (114) of the media content (102) with the classification value (110) of the media content (102).

In a possible embodiment, the fingerprint query unit (118) corresponds to software and/or hardware configured to search for a fingerprint (114) derived from media content (102) in the data repository (120) based on the classification value (110) of the media content (102). For example, the fingerprint query unit (118) may search the data repository (120) for the classification value (110) of the media content (102) and receive all the fingerprints for media content with that classification value (110). The fingerprints received from the data repository (120) may be compared to the query fingerprint (114) by the fingerprint query unit (118) to identify a match. Identifying a match may involve finding an exact match or finding an approximate match where a small portion of the fingerprints being matched are different.

In one or more embodiments of the invention, the data repository (120) corresponds to any data storage device (e.g., local memory on a client machine, multiple servers connected over the internet, systems within a local area network, a memory on a mobile device, etc.) or database known in the art in which media content fingerprints (114) may be stored and/or queried for based on the classification value (110) of the corresponding media content (102). In one or more embodiments of the invention, access to the data repository (120) may be restricted and/or secured. As such, access to the data repository (120) may require authentication using passwords, secret questions, personal identification numbers (PINs), biometrics, and/or any other suitable authentication mechanism. Elements or various portions of data stored in the data repository (120) may be distributed and stored in multiple data repositories (e.g., servers across the world). In one or more embodiments of the invention, the data repository (120) includes flat, hierarchical, network based, relational, dimensional, object modeled, or data files structured otherwise. For example, data repository (120) may be maintained as a table of a SQL database. In addition, data in the data repository (120) may be verified against data stored in other repositories.

3.0 Storing a Fingerprint Based on Media Content Classification

Figure 2:
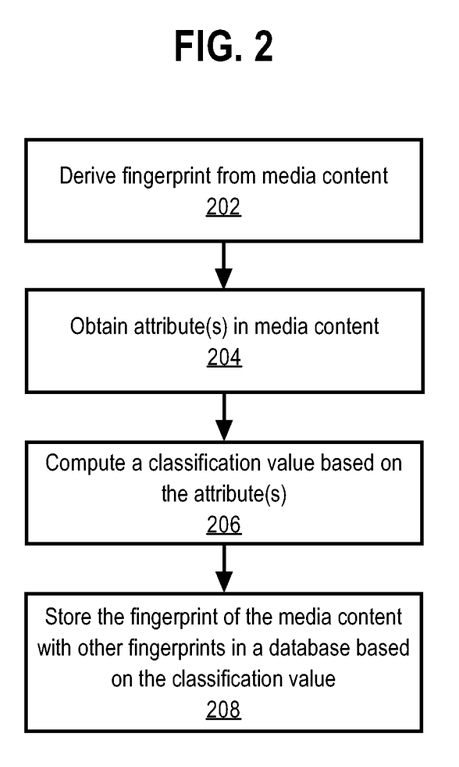
FIG. 2 illustrates an example procedure for storing a fingerprint, according to one or more embodiments.

FIG. 2 illustrates one example method for storing a fingerprint derived from media content based on the classification of the media content. One or more steps illustrated in FIG. 2 may be modified, rearranged, or omitted all together.

As depicted in FIG. 2, a fingerprint that is to be stored is derived from media content (Step 102). In a possible embodiment, the fingerprint may be derived by applying one or more functions to values computed from media content. For example, a function may derive a fingerprint using the difference in intensity values within a single image. Another example may involve applying a function that captures the difference in intensity values between different frames of a video clip. A function may project the range of intensity values computed from media content to a set of vectors to obtain a set of projected values and from the projected values compute signature bits that make up the fingerprint. In addition, any other method of deriving fingerprints from audio, visual, and audio/visual media content may be used.

In a possible embodiment, attributes in the media content are obtained (Step 204). Obtaining attributes may involve analyzing media content to determine attributes, receiving attributes from a user, extracting attributes from metadata, estimating attributes based on the source of the media content, or using any other suitable method. Visual attributes may be identified by searching an image or video clip for specific predetermined characteristics indicative of an attribute. Audio attributes may identified by searching an audio clip of a combination of sounds indicative of an audio attribute. For example, an audio/visual clip may be searched for the distinct sound of a basketball swishing through a net without hitting the rim. This swishing sound of the net may be associated with a basketball game. Accordingly, an audio/visual clip with this swishing sound may be identified with a basketball game as an attribute of the audio/visual clip. In another example, the distinct reflection of an eye's cornea may be identified in an image through image analysis and a deduction may be made that the image has a face. In another example, an audio clip may be analyzed to determine that the audio clip is reggae music based on the rhythmic notes in the audio clip. Accordingly, at least one attribute of the audio clip may be defined as reggae music. In accordance with one or more embodiments, any number of attributes may be searched for and identified in the media content. In another example, a media clip may be received from a basketball authority, and based on the source, may be associated with a sports attribute or basketball attribute.

Figure 4A:
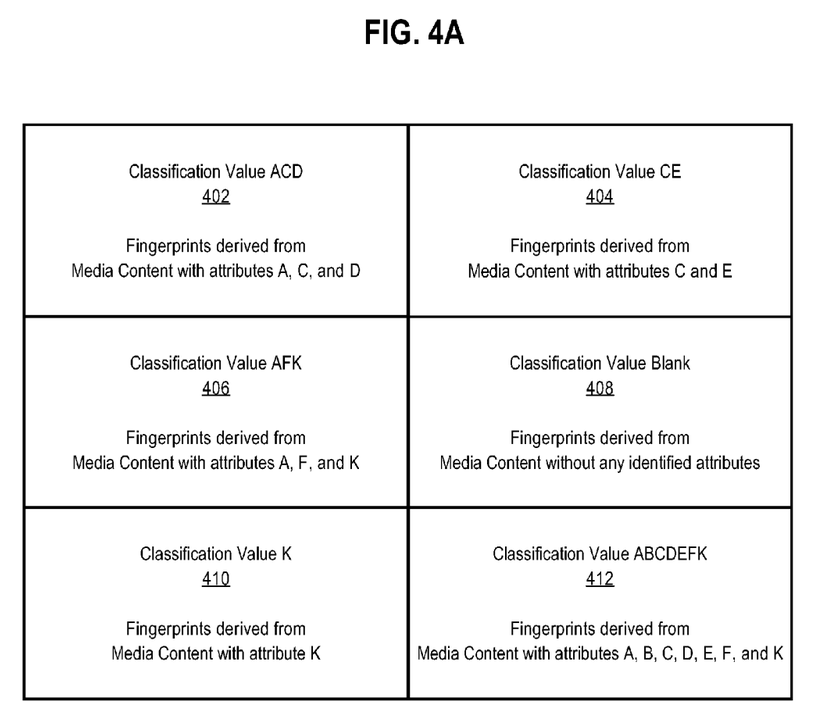
FIG. 4A-FIG. 4C depict a visualization of exemplary database organization schemes, according to one or more embodiments.
Figure 4B:
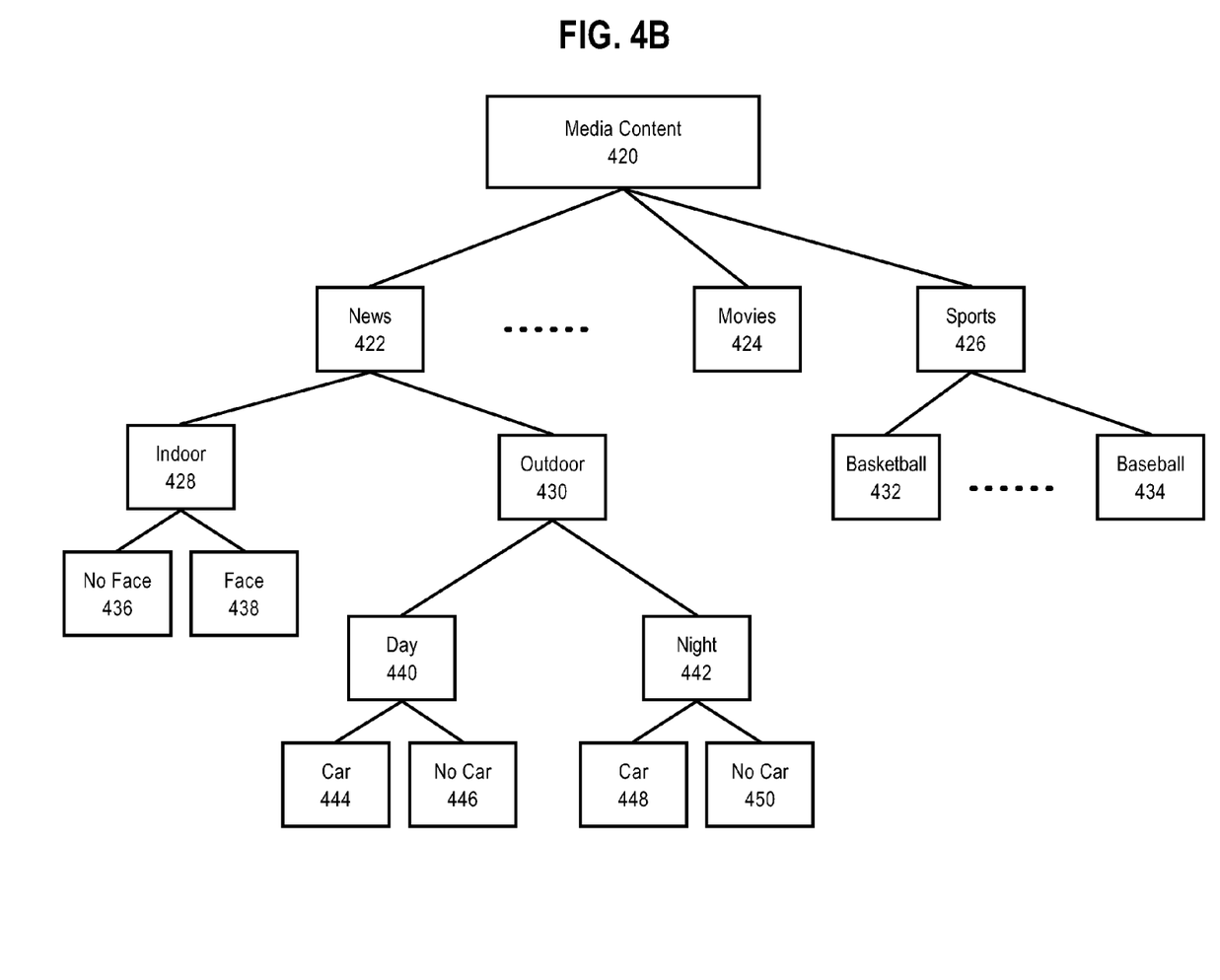

In a possible embodiment, a classification value of the media content is computed from the attributes in the media content (Step 206) and a fingerprint derived from the media content is stored based on the classification value of the media content (Step 208). Computing the classification value may involve simply listing the attributes or a representation (e.g., numerical, text based, graphical, etc.) of the attributes. Each combination of attributes may be one of a set of possible predetermined classification values. For example, as depicted in FIG. 4A, the classification value ACD (402) may be computed for media content with identified attributes A, C, and D. The fingerprints derived from media content with identified attributes A, C, and D are then indexed based on the classification value ACD (402). Similarly classification values CE (404), AFK (406), K (410), and ABCDEFK (412) are used for classifications of media content with the respective attributes and fingerprints derived from media content are stored with corresponding classification values. There may also be a classification value (e.g., classification value blank (408)) for media content without any identified attributes, where the fingerprint derived from the media content are stored based on this classification value. In a possible embodiment, the classification values correspond to nodes of a tree. For example, as depicted in FIG. 4B, the fingerprints of media content (420) may be categorized based on attributes of the media content into the nodes of a tree. In this exemplary figure, the fingerprints are first sorted by genre (e.g., news (422), movies (424), sports (426) etc.). Thereafter, fingerprints are sorted based on sub-attributes that are relevant to that attribute. For example, under the news (422) genre, indoor (428) scenes and outdoor (430) scenes may be used to for sub-categorization under genre. Under sports (426), fingerprints may be categorized by sport (e.g., basketball (432), baseball (434), etc.). Similarly, other attributes (e.g., no face (436), face (438), day (440), night (442), car (444), no car (446), car (448), no car (450)) may be used to categorize. Accordingly each node corresponds to attributes that have been traversed to reach that node. Thus, fingerprints derived from media content that are stored in association with no car node (450) may be derived from news filmed in the outdoors at night, without a car being present.

In a possible embodiment, computing the classification value may involve applying a function to values based on the attributes. For example, the presence or absence of each attribute may be associated with a specific attribute value and a classification value may be computed based on the attribute values that are determined through media content analysis. For example, the confidence level of each attribute identified in media content, indicative of the presence of the attribute, may be multiplied by N orthogonal vectors to provide a classification value in multi-dimensional space. Accordingly, based on the classification value, each media content within a database may be associated with a corresponding classification value in multi-dimensional space. In a possible embodiment, a classification value with a single number may be computed based on the attributes identified in the media content. Accordingly, as visualized in exemplary FIG. 4C, the set of classification values (460) may be mapped into a single dimension with corresponding fingerprints associated with the same media content as the classification value. In another example, a two dimensional space may be divided into different regions corresponding to predetermined classification values. Thereafter, the classification value associated with a predetermined region which includes the computed value based on a set of attributes is the classification value assigned to the media content.

Figure 3:
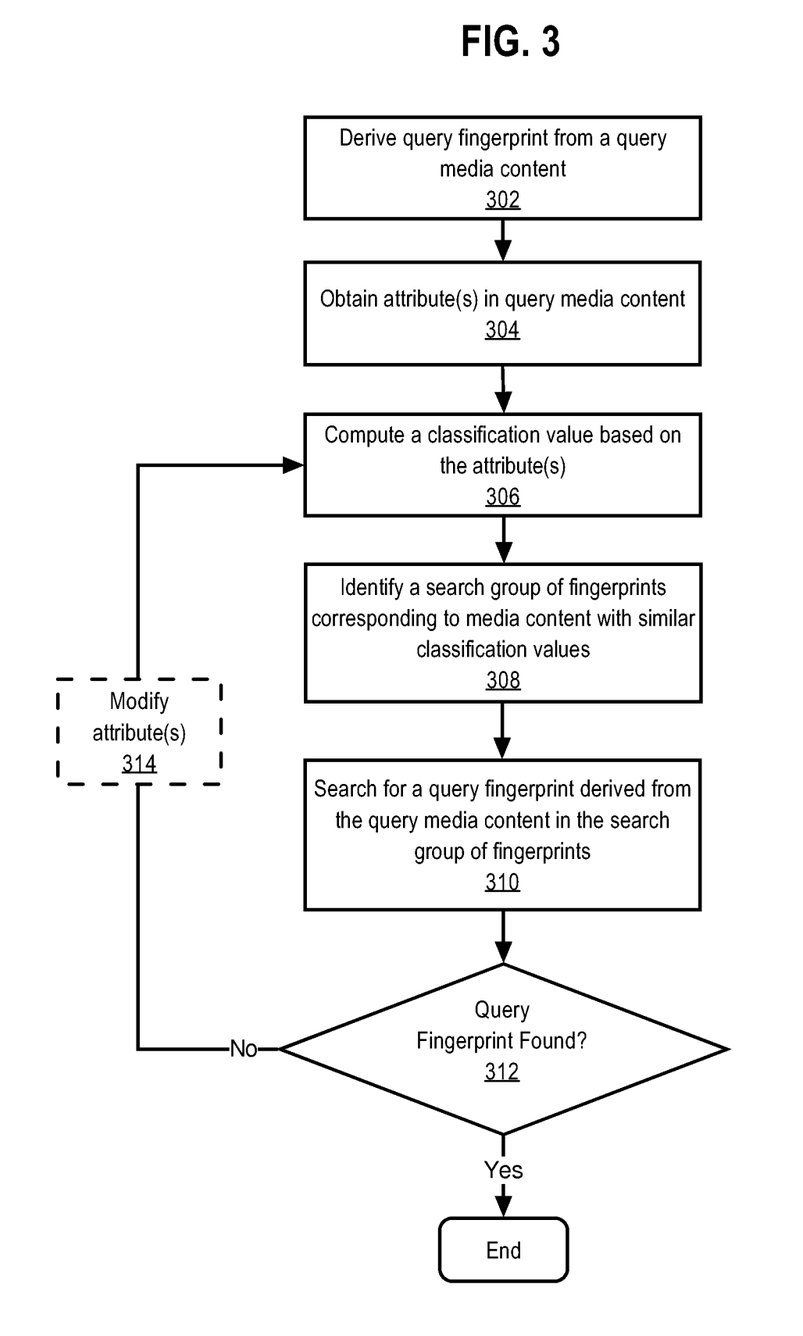
FIG. 3 illustrates an example procedure for searching for a fingerprint, according to one or more embodiments.

4.0 Searching for a Fingerprint of Media Content Based on Classification of the Media Content FIG. 3 illustrates one example method for searching for a fingerprint derived from media content based on the classification of the media content. One or more steps illustrated in FIG. 3 may be modified, rearranged, or omitted all together.

Step 302-Step 306 as depicted in FIG. 3 are essentially the same as Step 202-Step 206 as depicted in FIG. 2. In a possible embodiment, the classification value computed based on the attributes of the query media content is used to identify a search group of fingerprints derived from media content with similar classification values (Step 308). The search group of fingerprints includes the set of fingerprints that are searched to identify a match (e.g., exact match or similar match) with the query fingerprint derived from the query media content (Step 310). In a discrete category based scheme, as depicted in FIG. 4A, the identified search group may include fingerprints derived from media content with the exact same classification value as the query media content or similar classification values as the query media content. In a possible embodiment where the fingerprints are organized into a hierarchical structure, as depicted in FIG. 4B, the classification value of a query media content may be used to traverse to a particular node, and all the fingerprints stored at that node or children node of that node may be used to form the search group. In a possible embodiment, where the classification values comprise non-discrete numbers in one or more dimensions (e.g., one dimension depicted in FIG. 4C), a search group may include fingerprints derived from media content with classification values within a predetermined range from the query classification value. As depicted visually in a single dimension for ease of explanation in FIG. 4C, a value X (465) which is the classification value for a query media content is compared to other classification values (e.g., Classification Value A-Classification Value H). Thereafter, fingerprints derived from media content that has a classification value closest to value X are compared to the query fingerprint first in order to find a match. In this case, if a strict sequential order is implemented based on distance, the fingerprints derived from media content with classification values E, D, C, F, G, H, B, A (in this order) would be compared to the query fingerprint derived from the media content with classification value X to identify a match. The sequence of classification values E, D, C, F, G, H, B, A is ordered from the shortest distance to the longest distance from classification value X. In this example, a predetermined range from classification value X may used to limit the size of the search group. The ordering/range based on the distance from the classification value of the query media content to the other classification values may also be applied in multi-dimensional space. In an embodiment, the classification values of each media content are compared to the query classification value to determine a respective distance. Thereafter, the corresponding media content/fingerprint is compared to the query media content/query fingerprint in order of the smallest distance to the largest distance. If a classification value is not numerical, then the order may be determined based on similarity of the classification values and the query classification value.

Figure 4C:
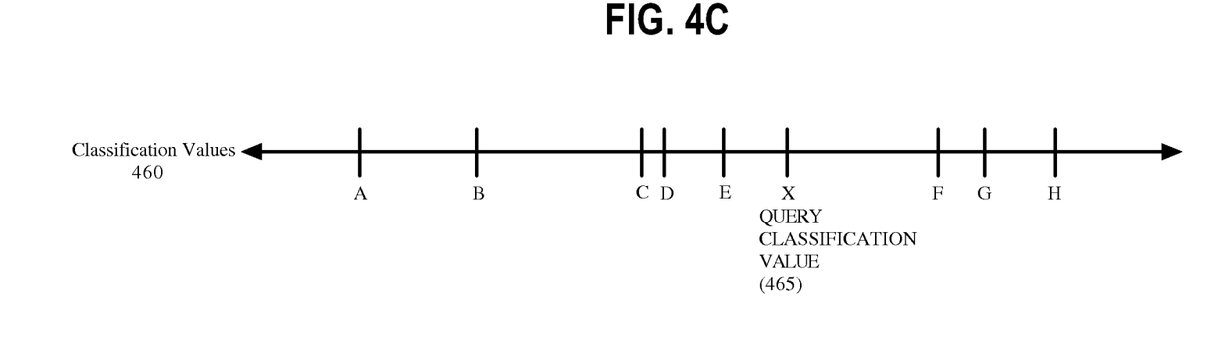

Thereafter, a determination is made whether the query fingerprint derived from the query media content is found in the search group of fingerprints (Step 312). If the query fingerprint matches a target fingerprint in the search group of fingerprints, then the target media content associated with the target fingerprint may be identified. The target media content may be identical to the query media content, may have an overlapping portion with the query media content, a modification of the query media content, etc. If the query fingerprint is not found, the set of attributes identified based on analysis of the media content in Step 304, are modified (Step 314). For example, attributes with a low confidence measure or those that are generally hard to detect, may be dropped from the set of attributes used to compute the classification value. The set of attributes may also be modified to include similar attributes to the ones previously identified. For example, a monotonous delivery of words used to identify a news genre may instead be used to identify a religious sermon genre. Any algorithm may be used to modify the set of attributes used to compute a new classification value for the query media content. In a possible embodiment, instead of or in addition to modifying the set of attributes, the search group identified in Step 308 may be expanded. For example, in a hierarchical organization scheme, as depicted in FIG. 4B, if the first search group identified included fingerprints derived from media content related to baseball (432), a new search group may include fingerprints derived from all media content related to sports (426). An example involving, non-discrete classification values in one or more dimensions, as depicted in FIG. 4C, the distance from the classification value of the query media content may be increased to include additional classification values, thereby including more fingerprints derived from media content with the additional classification values.

Example embodiments of the present invention are described above in relation to media fingerprints that generally correspond to media content. In the description of example embodiments, specific system architectures and methods have been used for describing the storing and searching for fingerprints derived from media content based on the attribute based classification value of the media content. Such specific system architectures and methods in the description above are provided merely for simplicity and unity and, should not be construed as limiting. Embodiments are well suited to function with any media content including, but not limited to, still images, video media, audio media, audio/visual media, audio spectrograms of an audio clip as media content clips.

5.0 Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
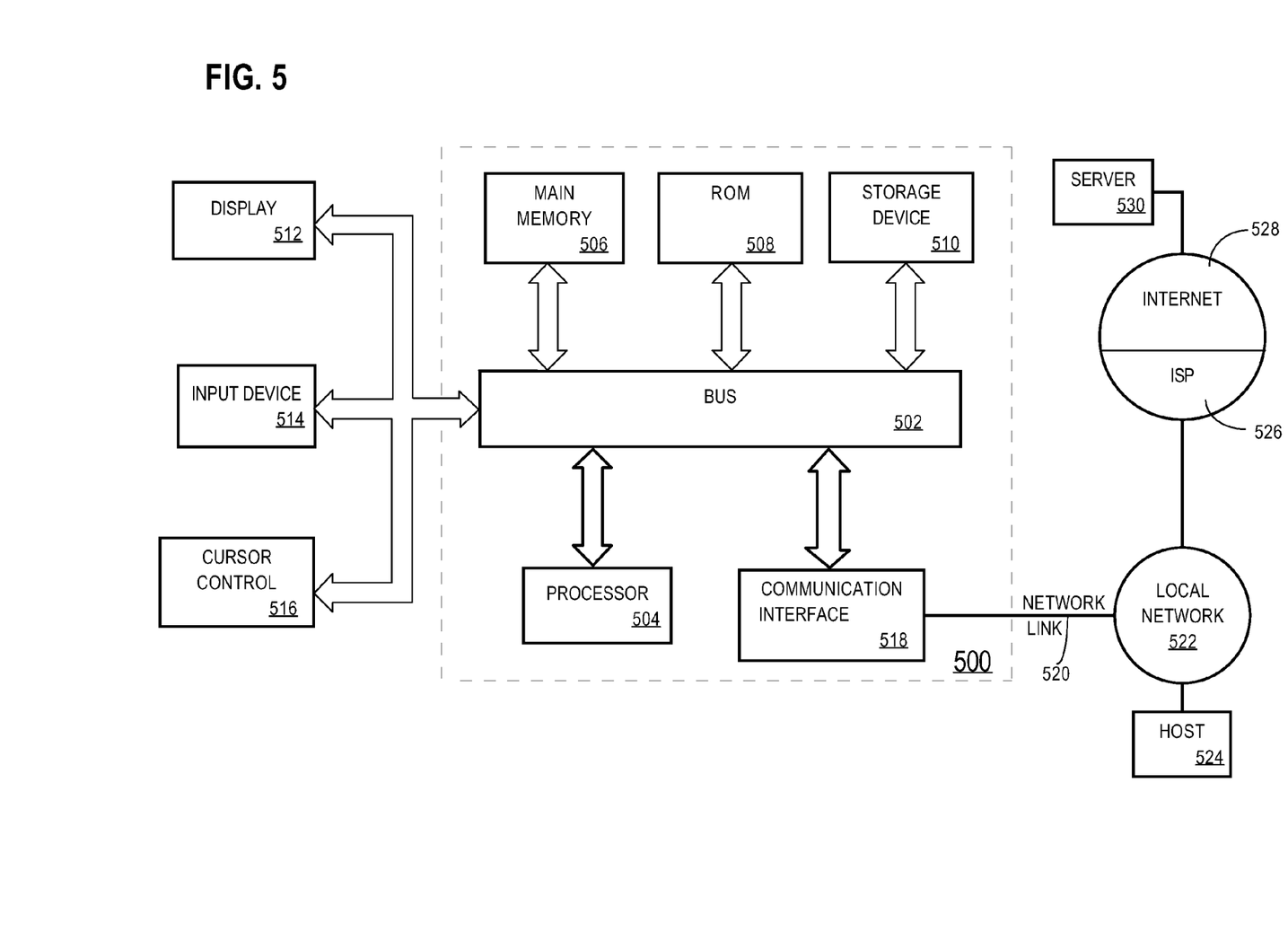
FIG. 5 depicts an example computer system platform, with which an embodiment of the present invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Figure 6:
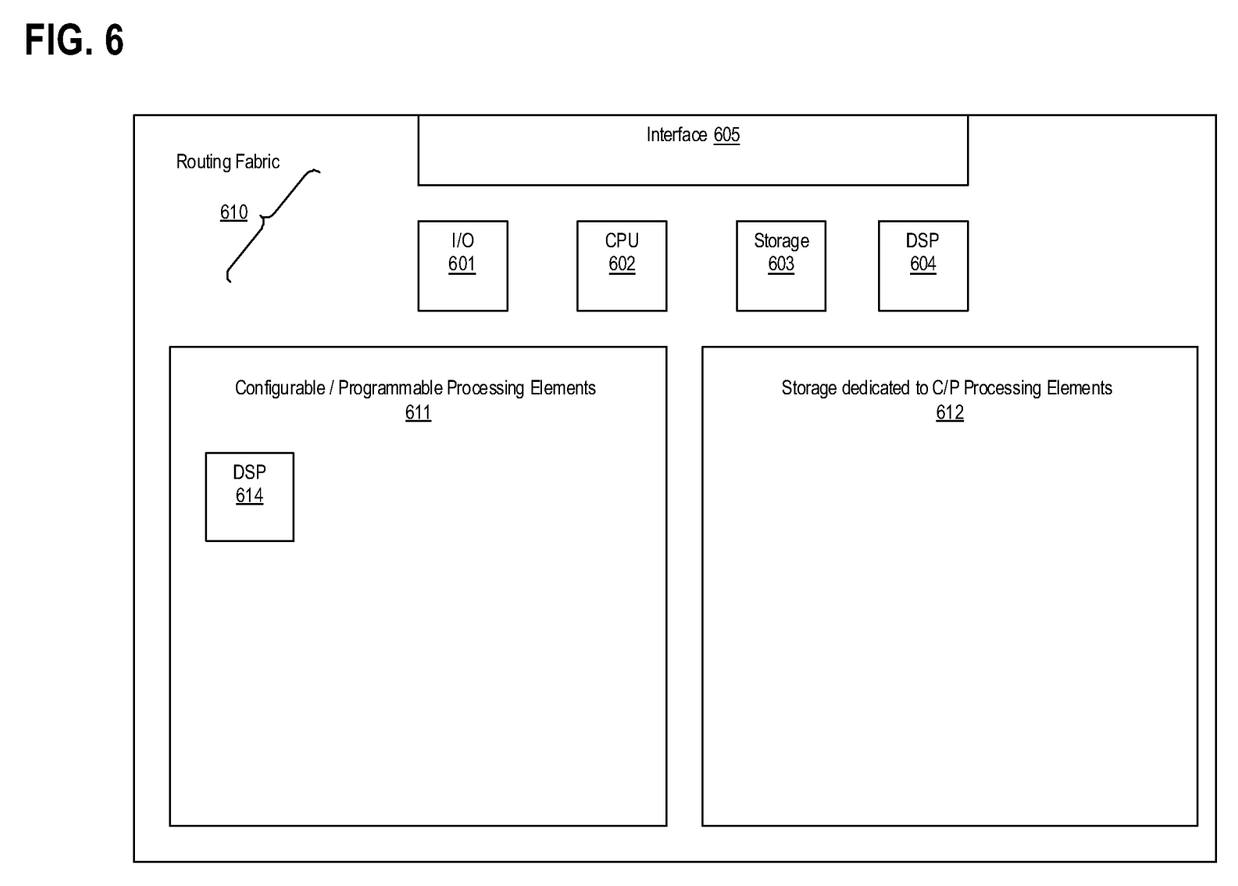
FIG. 6 depicts an example integrated circuit device, with which an embodiment of the present invention may be implemented.

FIG. 6 depicts an example IC device 600, with which a possible embodiment of the present invention may be implemented. IC device 600 may have an input/output (I/O) feature 601. I/O feature 601 receives input signals and routes them via routing fabric 610 to a central processing unit (CPU) 602, which functions with storage 603. I/O feature 601 also receives output signals from other component features of IC device 600 and may control a part of the signal flow over routing fabric 610. A digital signal processing (DSP) feature performs at least a function relating to digital signal processing. An interface 605 accesses external signals and routes them to I/O feature 601, and allows IC device 600 to export signals. Routing fabric 610 routes signals and power between the various component features of IC device 600.

Configurable and/or programmable processing elements (CPPE) 611, such as arrays of logic gates may perform dedicated functions of IC device 600, which in an embodiment may relate to deriving and processing media fingerprints that generally correspond to media content. Storage 612 dedicates sufficient memory cells for CPPE 611 to function efficiently. CPPE may include one or more dedicated DSP features 614.

6.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    determining whether each of one or more perceptible characteristics is present in a first media content, wherein each of one or more attributes corresponds to a respective perceptible characteristic in the one or more perceptible characteristics, wherein each of the one or more perceptible characteristics is one of a specific perceptible audio characteristic or a specific perceptible visual characteristic;
    computing an attribute value for each attribute in the one or more attributes, wherein the attribute value comprises a binary indicator to indicate a presence or absence of a respective perceptible characteristic in the one or more perceptible characteristics in the first media content;
    combining, from the one or more attributes, one or more attribute values into a first classification value of the first media content, wherein the one or more attribute values comprise the attribute value computed for the each attribute in the one or more attributes;
    storing a first fingerprint derived from the first media content in a database, the first fingerprint being indexed in the database with the first classification value;
    applying a plurality of fingerprints respectively indexed by a plurality of classification values, in the database, to process media content queries to determine whether query media contents match any in a plurality of media contents from which the plurality of fingerprints is derived, wherein the plurality of media contents includes the first media content, and wherein the plurality of fingerprints includes the first fingerprint indexed by the first classification value;
    wherein the method is performed by one or more computing devices.

2. The method as recited in claim 1, wherein an attribute value of the one or more attribute values comprises a confidence measure that indicates a likelihood of a presence of a respective attribute in the first media content.

3. The method as recited in claim 1, wherein the one or more attribute values are weighted when computing the first classification value.

4. The method as recited in claim 3, wherein a weight of an attribute value depends on a degree of detectability of a corresponding attribute.

5. The method as recited in claim 1, further comprising:
    receiving user input indicating the one or more attributes;
    analyzing the first media content to detect the one or more perceptible characteristics to which the one or more received attributes correspond by using one or more audio/video analysis methods.

6. The method as recited in claim 1, further comprising:
    extracting the one or more attributes from metadata associated with the first media content;
    analyzing the first media content to detect the one or more perceptible characteristics to which the one or more extracted attributes correspond by using one or more audio/video analysis methods.

7. The method as recited in claim 1, wherein the first fingerprint of the first media content is stored in a pair with the first classification value.

8. The method as recited in claim 1, wherein the first fingerprint of the first media content is stored at a node of a tree, wherein each node is identified by a classification value associated with one or more respective fingerprints.

9. The method as recited in claim 1, wherein storing a first fingerprint derived from the first media content in a database comprises storing the first fingerprint at a location, within the database, determined by the first classification value.

10. The method as recited in claim 1, further comprising:
    computing a second classification value of a second media content based on the one or more attributes;
    determining whether the second classification value of the second media content is identical to the first classification value;
    responsive to determining that the second classification value is identical to the first classification value, performing:
        retrieving the first fingerprint based on the first classification value;
        comparing the first fingerprint to the second fingerprint; and
        determining that the second media content is derived from the first media content based on determining that the first fingerprint is similar to the second fingerprint.

11. The method as recited in claim 1, wherein at least one attribute in the one or more attributes comprises information about objects in a scene.

12. The method as recited in claim 1, wherein at least one attribute in the one or more attributes refers to one of a genre, an indoor scene, an outdoor scene, a day scene, or a night scene.

13. A method comprising:
    determining whether each of a first plurality of perceptible characteristics is present in a query media content, wherein each of a first plurality of attributes corresponds to a respective perceptible characteristic in the first plurality of perceptible characteristics, wherein each of the first plurality of perceptible characteristics is one of a specific perceptible audio characteristic or a specific perceptible visual characteristic;

computing an attribute value for each attribute in the first plurality of attributes, wherein the attribute value comprises a binary indicator to indicate a presence or absence of a respective perceptible characteristic in the first plurality of perceptible characteristics in the query media content;

combining, from the first plurality of attributes, a first plurality of attribute values into a first query classification value for the query media content, wherein the plurality of attribute values comprises the attribute value computed for the each attribute in the plurality of attributes;

determining whether the first query classification matches with a first classification value stored in a database, wherein a plurality of fingerprints respectively indexed by a plurality of classification values, in the database, is applied to process media content queries for determining whether query media contents match any in a plurality of media contents from which the plurality of fingerprints is derived;

in response to determining that the first query classification matches with the first classification value stored in the database, performing:
accessing a first set of one or more fingerprints stored at locations, in the database, indexed by the first classification value, the first set of one or more fingerprints being derived from a first set of media contents;
determining whether a query fingerprint derived from the query media content matches with a fingerprint in the first set of one or more fingerprints;

wherein the method is performed by one or more computing devices.

14. The method as recited in claim 13, further comprising:
in response to determining that the first query classification does not match with any classification value stored in a database, performing:
removing an attribute from the first plurality of attributes to obtain a second plurality of attributes;
computing a second query classification value for the query media content based on a second plurality of attribute values of the second plurality of attributes;
determining whether the second query classification matches with a second classification value stored in a database;
in response to determining that the second query classification matches with a second classification value stored in the database, performing:
accessing a second set of one or more fingerprints stored at locations, in the database, indexed by the second classification value, the second set of one or more fingerprints being derived from a second set of media contents;
determining whether the query fingerprint derived from the query media content matches with a fingerprint in the second set of one or more fingerprints.

15. The method as recited in claim 14, wherein removing the attribute from the first plurality of attributes to obtain the second plurality of attributes is responsive to a low confidence measure of the attribute in the first plurality of attributes.

16. The method as recited in claim 15, wherein the low confidence measure of the attribute is low relative to confidence measures of other attributes in the first plurality of attributes.

17. The method as recited in claim 13, further comprising, in response to determining that the query fingerprint derived from the query media content matches with the fingerprint in the first set of one or more fingerprints, identifying a corresponding media content in the first set of media contents.

18. The method as recited in claim 13, wherein each media content of the first set of media contents is associated with a classification value within a predetermined range from the first classification value.

19. The method as recited in claim 13, further comprising:
determining a distance between a classification value of each media content of the first set of media contents and the first query classification value for the query media content; and
determining an order of the first set of media contents based on smallest distance to largest distance between respective classification values and the first query classification value;
wherein the first set of fingerprints is searched in the order of the first set of media contents.

20. The method as recited in claim 13, wherein at least one attribute in the first plurality of attributes comprises information about objects in a scene.

21. The method as recited in claim 13, wherein at least one attribute in the first plurality of attributes refers to one of a genre, an indoor scene, an outdoor scene, a day scene, or a night scene.

22. A system, comprising:
one or more processors, and
a computer readable storage medium with one or more sequences of stored instructions, which when executed with the one or more processors, cause the one or more processors to perform a process, wherein the process comprises the steps of:
determining whether each of one or more perceptible characteristics is present in a first media content, wherein each of one or more attributes corresponds to a respective perceptible characteristic in the one or more perceptible characteristics, wherein each of the one or more perceptible characteristics is one of a specific perceptible audio characteristic or a specific perceptible visual characteristic;
computing an attribute value for each attribute in the one or more attributes, wherein the attribute value comprises a binary indicator to indicate a presence or absence of a respective perceptible characteristic in the one or more perceptible characteristics in the first media content;
combining, from the one or more attributes, one or more attribute values into a first classification value of the first media content, wherein the one or more attribute values comprise the attribute value computed for the each attribute in the one or more attributes;
storing a first fingerprint derived from the first media content in a database, the first fingerprint being indexed in the database with the first classification value;
applying a plurality of fingerprints respectively indexed by a plurality of classification values, in the database, to process media content queries to determine whether query media contents match any in a plurality of media contents from which the plurality of fingerprints is derived, wherein the plurality of media contents includes the first media content, and wherein the plurality of fingerprints includes the first fingerprint indexed by the first classification value.

23. A non-transitory computer readable storage medium having encoded instructions which, when executed by one or more processors, cause the one or more processors to perform a process, wherein the process comprises the steps of:
   determining whether each of one or more perceptible characteristics is present in a first media content, wherein each of one or more attributes corresponds to a respective perceptible characteristic in the one or more perceptible characteristics, wherein each of the one or more perceptible characteristics is one of a specific perceptible audio characteristic or a specific perceptible visual characteristic;
   computing an attribute value for each attribute in the one or more attributes, wherein the attribute value comprises a binary indicator to indicate a presence or absence of a respective perceptible characteristic in the one or more perceptible characteristics in the first media content;
   combining, from the one or more attributes, one or more attribute values into a first classification value of the first media content, wherein the one or more attribute values comprise the attribute value computed for the each attribute in the one or more attributes;
   storing a first fingerprint derived from the first media content in a database, the first fingerprint being indexed in the database with the first classification value;
   applying a plurality of fingerprints respectively indexed by a plurality of classification values, in the database, to process media content queries to determine whether query media contents match any in a plurality of media contents from which the plurality of fingerprints is derived, wherein the plurality of media contents includes the first media content, and wherein the plurality of fingerprints includes the first fingerprint indexed by the first classification value.

24. A system, comprising:
   one or more processors, and
   a computer readable storage medium with one or more sequences of stored instructions, which when executed with the one or more processors, cause the one or more processors to perform a process, wherein the process comprises the steps of:
      determining whether each of a first plurality of perceptible characteristics is present in a query media content, wherein each of a first plurality of attributes corresponds to a respective perceptible characteristic in the first plurality of perceptible characteristics, wherein each of the first plurality of perceptible characteristics is one of a specific perceptible audio characteristic or a specific perceptible visual characteristic;
      computing an attribute value for each attribute in the first plurality of attributes, wherein the attribute value comprises a binary indicator to indicate a presence or absence of a respective perceptible characteristic in the first plurality of perceptible characteristics in the query media content;
      combining, from the plurality of attributes, a first plurality of attribute values into a first query classification value for the query media content, wherein the plurality of attribute values comprises the attribute value computed for the each attribute in the plurality of attributes;
      determining whether the first query classification matches with a first classification value stored in a database, wherein a plurality of fingerprints respectively indexed by a plurality of classification values, in the database, is applied to process media content queries for determining whether query media contents match any in a plurality of media contents from which the plurality of fingerprints is derived;
      in response to determining that the first query classification matches with the first classification value stored in the database, performing:
         accessing a first set of one or more fingerprints stored at locations, in the database, indexed by the first classification value, the first set of one or more fingerprints being derived from a first set of media contents;
         determining whether a query fingerprint derived from the query media content matches with a fingerprint in the first set of one or more fingerprints.

25. A non-transitory computer readable storage medium having encoded instructions which, when executed by one or more processors, cause the one or more processors to perform a process, wherein the process comprises the steps of:
   determining whether each of a first plurality of perceptible characteristics is present in a query media content, wherein each of a first plurality of attributes corresponds to a respective perceptible characteristic in the first plurality of perceptible characteristics, wherein each of the first plurality of perceptible characteristics is one of a specific perceptible audio characteristic or a specific perceptible visual characteristic;
   computing an attribute value for each attribute in the first plurality of attributes, wherein the attribute value comprises a binary indicator to indicate a presence or absence of a respective perceptible characteristic in the first plurality of perceptible characteristics in the query media content;
   combining, from the first plurality of attributes, a first plurality of attribute values into a first query classification value for the query media content, wherein the plurality of attribute values comprises the attribute value computed for the each attribute in the plurality of attributes;
   determining whether the first query classification matches with a first classification value stored in a database, wherein a plurality of fingerprints respectively indexed by a plurality of classification values, in the database, is applied to process media content queries for determining whether query media contents match any in a plurality of media contents from which the plurality of fingerprints is derived;
   in response to determining that the first query classification matches with the first classification value stored in the database, performing:
      accessing a first set of one or more fingerprints stored at locations, in the database, indexed by the first classification value, the first set of one or more fingerprints being derived from a first set of media contents;

determining whether a query fingerprint derived from the query media content matches with a fingerprint in the first set of one or more fingerprints.

* * * * *